United States Patent Office 3,635,877
Patented Jan. 18, 1972

3,635,877
USE OF HETEROCYCLIC ACIDS IN PHENOLIC RESINS
Paul H. Van Wyk, Forest Park, Ill., assignor to CPC International Inc.
No Drawing. Filed July 7, 1969, Ser. No. 839,699
Int. Cl. C08g 51/04
U.S. Cl. 260—38
34 Claims

ABSTRACT OF THE DISCLOSURE

Covers a composition comprising, as a major component, solid discrete inert filler particles, and as a minor component, a thermosetting phenolic resin composition. The phenolic resin composition comprises the reaction product of an aldehyde with a phenolic compound in the ratio of between about 0.5 and about 0.85 mole of aldehyde per mole of phenolic compound, a cross-linking agent, and a heterocyclic acid which imparts a high degree of fluidity to the resin in its fused state in an amount falling within the range from about 0.5% to about 12% by weight based on total weights of the aldehyde and the phenolic compounds. A process for preparing the composition described above is disclosed. Molded products made from the composition are also set out. In particular, the composition can be made into shell molds and cores. The molds and cores exhibit significantly reduced peel back.

---

This invention is concerned with the synthesis of thermosetting phenolic resins useful in the formation of molding compositions and with molded product produced by heating the molding compositions.

An object of this invention is to provide a moldable composition comprising as a major component, solid discrete inert filler particles and as a minor component, a thermosetting phenolic resin composition wherein the resin exhibits a high degree of fluidity in its fused state.

Another object of the invention is to provide a moldable composition comprising as a major component, solid discrete inert filler particles and as a minor component, a thermosetting phenolic resin composition including a heterocyclic acid as one component of the resin composition.

Yet another object of the invention is to provide a moldable composition from which molded articles can be formulated which peel back from mold patterns to a significantly reduced degree.

A further object of the invention is to provide a moldable composition comprising a mixture of solid discrete inert filler particles and a thermosetting phenolic resin wherein the resin comprises a mixture of the reaction product of an aldehyde with a phenolic compound in the ratio of between about 0.5 and about 0.85 mole of aldehyde per mole of phenolic compound, a cross-linking agent for the reaction product which cross-links the reaction product, and a heterocyclic acid which imparts a high degree of fluidity to the resin in its fused state.

A still further object of the invention is to provide a process for preparing moldable compositions as described above.

A further object still of the invention is to provide a process for preparing molded compositions as described above.

A yet further object of the invention is to provide a thermosetting resin composition which may be used as a bonding agent in brakes, grinding wheels, sandpaper, emery paper, emery-boards, wood particle boards, glass and rockwool fibers, and sand molds and cores.

GENERAL DESCRIPTION OF THE INVENTION

The invention is a composition comprising a mixture of a major proportion of solid discrete inert filler particles and a minor proportion of a thermosetting phenolic resin. The resin composition comprises the reaction product of an aldehyde with a phenolic compound in the ratio of between about 0.5 and 0.85 mole of aldehyde per mole of phenolic compound, a cross-linking agent which cross-links the reaction product, and a heterocyclic acid which imparts a high degree of fluidity to the resin in its fused state. The heterocyclic acid is present in an amount falling within the range from about 0.05% to about 12% by weight of the reaction product.

The thermosetting phenolic resin generally comprises from about 1% to about 35% by weight of the composition.

Also part of the invention is a process for preparing the composition just described. The process comprises forming a mixture of a thermosetting phenolic resin compound and solid discrete inert filler particles by mixing the reaction product of an aldehyde and a phenolic compound, a cross-linking agent, and a heterocyclic acid in the proportions specified above with the filler particles to yield the composition.

The preferred aldehyde and phenolic compound for use in the reaction are formaldehyde and phenol respectively.

Cross-linking agents which may be used in the practice of the invention include resole resins, paraformaldehyde, trioxymethylene, epoxy compounds, diisocyanates, hexamethylenetetramine and its chloride, sulfate, acetate, tartrate, citrate, benzene sulfonate, toluene p-sulfonate, camphorate, arsenate, trimetaborate, sulfosalicylate, phthalate, perchlorate, chromate and tannate salts, and mixtures thereof.

The preferred cross-linking agent for use in the practice of the invention is hexamethylenetetramine. Preferably from about 2% to about 20% by weight of hexamethylenetetramine is used based on total resin weight.

The preferred resin for use in the practice of the invention is a novolac resin.

The heterocyclic acids usable in the practice of the invention generally contain conjugated double bonds within the heterocyclic ring structure. The preferred heterocyclic acids are acids wherein the acid group is attached to the ring structures of pyridine, furan, thiophene, pyrrole, s-triazine, thiazole, azocine, benzothiophene, naphthothiophene, thianthrene, pyran, isobenzofuran, chromene, xanthene, phenoxathiin imidazole, pyrazole, pyrazine, pyrimidine, pyridazine, indolizine, isoindole, indole, purine, isoquinoline, quinoline, phthalazine, naphthyridine, quinoxaline, quinazoline, cinnoline, pteridine, carbazole, beta-carboline, phenanthridine, acridine, perimidine, phenanthroline, phenazine, phenarsazine, isothiazole, phenothiazine, isoxazole, furazan and phenoxazine. The most preferred heterocyclic acids are carboxylic acids based upon pyridine, furan, thiophene, and pyrrole heterocyclic systems. The most preferred heterocyclic acid, because of easy availability and relatively low cost, is 2-furoic acid.

The preferred heterocyclic acid may be represented by the formula,

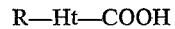

R—Ht—COOH where R is selected from the group consisting of hydrogen, methyl, ethyl, fluoro, hydroxy, and methoxy radicals and Ht is a bivalent heterocyclic radical. Preferably, the heterocyclic radical is selected from the group consisting of pyridenediyl, furandiyl, thiophenediyl, and pyrrolediyl.

The solid discrete inert filler particles are preferably selected from the group consisting of sand, asbestos, wood waste, fiberglas and abrasive grit.

Incorporation of the heterocyclic acid additive into the resin may be accomplished by adding the heterocyclic acid at any stage of the preparation of the resin or of compositions made from the resin. For example, the heterocyclic acid may be added to the phenolic compound before condensation with the aldehyde, to the aldehyde before condensation with the phenolic compound, to a water solution of the resin resulting from reaction of the phenolic compound with the aldehyde, to the partially dried resin resulting from evaporating water from the phenolic resin system, to solid dried resin, to resin dissolved in any solvent, to the ground resin-filler particle-cross-linking agent mixtures, to resin solution-cross-linking agent-filler particle mixtures, and the like.

The use of a heterocyclic acid additive in thermosetting phenolic resins leads to the attainment of several desired characteristics. First, higher tensile strength compositions a regenerally formed when the resin is used as a binder for filler particles. Second, phenolic resins containing the heterocyclic acid additive have a high degree of fluidity in the molten or fused state. The resin may thus flow freely, and distribute itself evenly about the filler particles. When the resin is used with sand or like materials to form shell molds and cores significantly less peel back from the mold, core, and pattern occcurs.

The preferred composition and method for forming a molded product from the composition is dependent upon the particular inert filler particles being coated and its intended end use. Suitable compositions for forming a variety of molded products are revealed in the following.

Friction materials

Phenolic resins are the principal bonding agents for the production of friction materials such as brakes and the like. The phenolic resins provide the bonding strength and the basic friction and wear characteristic. A typical formula would include from about 5% to about 15% resin, from about 45% to about 70% asbestos, and from about 20% to about 40% of additional fillers. Common additional fillers are cured cashew nut shell liquid resin particles, for more uniform friction performance, and barite, to provide better wear and higher density.

The friction materials are made by placing the formula as outlined above in a mold and pressurizing the mold to a pressure of from about 2000 to about 8000 p.s.i. The molded article is then heated to a temperature of from about 280° F. to about 380° F. The particular pressure and temperature used differ depending on the properties desired in the finished friction material.

Friction materials made utilizing asbestos and the other fillers just mentioned in conjunction with the thermosetting phenolic resin compound of this invention, which contains a heterocyclic acid as one component, are especially outstanding in that they have high tensile strength.

Bonded abrasives

Nearly 50% of the grinding wheels produced in the world are bonded with phenolic resins. Resin bonded wheels can withstand shock better than can the various ceramic bonded wheels. In addition, the higher tensile strength of the resin bond permits greater wheel rotation speed which in turn leads to more efficient metal removal. The major abrasive materials which are used in grinding wheels are silicon carbide and aluminum oxide in grit sizes from about 12 to about 325 mesh.

Grinding wheels are generally made by first wetting the grit with a low viscosity phenolic resin or furfural using from about 1% to about 3% by weight of resin based on the total weight of the grit. A dry mixture of phenolic resin and fillers is then added to the grit and the combination is tumbled until each particle of grit has a powder coating. This creates a mix that is dry and free flowing. The amount of powdered phenolic resin used falls within the range from about 6% to about 10% by weight based on the weight of the grit. Various additional fillers are used depending upon the intended use of the wheel.

The free flowing resin-grit mix is placed in a mold. The mold is pressed, generally at room temperature for from 1 to 2 minutes at a pressure of from about 2,000 to about 5,000 p.s.i. The grinding wheel is then removed from the mold and cured by slowly increasing the temperature to about 365° F. and then holding at this temperature for 8 to 12 hours. Other curing times, temperatures, and pressures may be utilized to obtain grinding wheels with different properties.

The thermosetting phenolic resin composition of this invention which contains as one component a heterocyclic acid, is particularly advantageous for use in the formation of grinding wheels because of the high tensile strength obtainable utilizing this particular thermosetting resin.

Coated abrasives

Phenolic resins are extensively used for the production of sandpaper, emerycloth, and emery boards since they are especially usable in applications where heat is generated in dry grinding or where water cooling is required.

In the production of coated abrasives, a coat of resin is deposited upon a backing material such as paper, cloth, or other cellulosic material. Loose grit is then adhered, often electrostatically, by passing the backing material, which is wet with the resin, wet side down over a supply of grit. Electrostatic attraction causes the grit to adhere to the paper and to become embedded in the resin.

The uncured but coated sheet is then partially dried in a low temperature oven usually at about 140° F. and a second thinner coating of resin is supplied to anchor the grit thoroughly. The resin is then cured at a temperature in the range from about 250° F. to about 380° F.

The phenolic resin composition produced in accordance with the present invention is useful for the production of coated abrasives. Its usefulness is enhanced due to the high tensile strength characteristic of the phenolic resin containing the heterocyclic acid.

Wood-particle board

Large volumes of sawdust are produced each year. The wood particle board industry is based upon the use of this sawdust to produce a wide variety of molded articles. In the production of the molded articles different blends of wood particles are used. For example, flat panelboards generally contain about 5% resin and the remainder woodshavings. They are generally cured at about 200 p.s.i. and at about 340° F. for short periods of time. Toilet seats, on the other hand, are generally blended with 10% to 15% phenolic resin and are cured at 500 to 1200 p.s.i. for a few minutes at a temperature that falls in the range from about 320° F. to about 350° F.

Generally, it is desirable to maintain the resin content of the wood particle board at as low a value as is possible consonant with retaining the necessary strength characteristic. This requirement arises because of the relatively high cost of resin as compared to sawdust.

The thermosetting phenolic resin product produced in accordance with the invention is attractive for use in the production of wood particle board because of its high tensile strength. This high tensile strength characteristic makes possible the production of wood particle board of a desired strength while utilizing smaller quantities of resin.

Insulating materials

Acoustical and thermal insulation may be produced from glass and rockwool fibers by bonding the fibers together with phenolic resins. Many processes exist for accomplishing this. For example, low molecular weight water soluble resins may be diluted to 10% to 15% solids and sprayed on glass fibers as they are being steam blown from a molten state. The excess water is evaporated due to the heat of the glass. The felted fibers collect at the bottom of the blowing chamber and are cured by heating to from about 280° F. to about 380° F. In a second process, powdered resin is mixed with chopped glass fibers in a chamber. The resulting mixture or mat is cured in an oven operated in the range from 280° F. to 380° F.

Organic fibers may also be bonded with phenolic resin. A powdered phenolic resin is usually used for this procedure. As the fiber comes off a standard cotton backing garment, the powdered resin is sifted onto the fiber. The fabric is then heated as above to obtain a resin coating.

Phenolic resins containing heterocyclic acids have an advantage over other phenolic resins in the preparation of insulating materials since their low viscosity characteristics in the molten state insures uniform bonding with a minmum quantity of resin.

Foundry applications

Phenolic resins are extensively used to make shell molds for use in metal casting applications. In the present preferred process, resin is coated onto each grain of sand or aluminum silicate, or the like by heating and mulling a resin-sand-cross-linking agent mixture. The mixture is generally heated to a temperature of from about 150° F. to about 400° F. The mulling may be performed in the presence of a solvent such as water, ketones, and alcohols. The cross-linking agent is usually added to the mixture after the coating of the sand is essentially complete and the resulting thermosetting resin-sand composition is immediately cooled. The mulling continues during the cooling process. The resulting product is a dry free flowing resin coated sand.

The coated sand is placed on a metal pattern heated to about 450° F. In less than a minute, usually from about 15 to 30 seconds, a shell of sand is formed which is bonded together by the fused resin. The excess sand is then removed by inverting the pattern. The pattern with its adhering sand shell is cured from 1 to 2 minutes in an oven at a temperature falling within the range from about 600° F. to about 1000° F. After removal from the pattern, the cured half mold is mated and bonded with another half mold. The resulting sand mold is ready to receive molten metal.

Shell cores, both solid and hollow, can also be made from resin coated sand. This is accomplished by blowing coated sand into a heated core mold. When hollow cores are desired the center portion of the unfused mix is drained before final curing.

Any sand may be used to form shell molds and cores. Certain sands are preferred because they form molds or cores having specific desirable characteristics. Examples of useful sands are lake sand; bank sand, relatively pure silica sand, such as Wedron sand (Wedron Silica Company, Chicago, Illinois) and Ottawa sand (Ottawa Silica Company, Ottawa, Ill.); olivine sand; zircon sand; and chromite sand.

The resin content required for adequate strength sand molds usually falls in the range from about 2% to about 5% resin based on sand weight. Special molds may require even more resin. Two step resins containing from about 8% to about 18% hexamethylenetetramine based on resin weight are most often used. A waxy lubricant such as calcium stearate, Acrawax C (a fatty acid bisamide made by reacting ethylenediamine with a mixture of fatty acids of the oleic and stearic types, available from Glyco Chemicals Inc., New York, N.Y.) carnauba wax, and montan wax in quantities of up to about 10% by weight based on the resin weight is often added during the coating cycle to improve the flowability of the mix and to improve the release of the mold from the pattern.

Other additives are used to minimize metal surface defects on metal articles made using sand molds and cores. Typical of such additives are black iron oxide, red iron oxide, calcium carbonate, potassium fluoroborate, and sulfur. Generally from about 0.5% to 5% by weight of one or combinations of these additives are used based on sand weight.

Cores and molds made with phenolic resins that contain a heterocyclic acid additive exhibit markedly reduced peel back. Less molds and cores have to be discarded because of excessive peel back. This is an extremely desirable result of using a heterocyclic acid additive.

The following examples describe specific demonstrations of the production and properties of compositions containing a heterocyclic acid additive. These examples are meant to be illustrative and the invention, of course, is not to be limited thereto. All parts and percentages are by weight unless expressly stated to be otherwise.

EXAMPLE 1

Effect of heterocyclic acid upon properties of flake phenolic resin

A flake phenolic resin was synthesized by reacting phenol with formaldehyde in an aqueous acidic solution to form a novolac resin. The acid was neutralized and the water was removed under vacuum at 250° F. to 300° F.

The still hot resin was divided into two aliquots. One aliquot was run through a Blaw-Knox flaker where it was cooled and formed into flakes. Furoic acid, 4% based on the weight of the resin, was added to the second aliquot which was then similarly cooled and formed into flakes.

Each aliquot was individually used to coat sand and form molds by the shell mold process. Hexamethylenetetramine and calcium stearate were added to each of the compositions during the sand coating process.

The above described processes were carried out in a Hobart mixer. The melting points of the two resin coated sands, and the tensile strengths and hot tensile strengths of the two resin coated sand mold samples were then determined by the following procedures:

Melting point.—A metal bar is heated so that one end is hotted than the other. A series of thermometers are inserted into wells spaced equally along the length of the bar so that the temperature at many places along the bar's length is known. A strip of resin coated sand is laid lengthwise along the surface of the bar. The resin coated sand is allowed to set on the bar for exactly one minute. Loose sand is then blown off of the bar with 10 p.s.i.g. air. The temperature of the bar where the sand just sticks to the bar is determined by linear extrapolation from the known temperatures of the two closest thermometers. The above process is repeated two additional times. The melting points reported are the average of three melting points.

Tensile strength.—The tensile strength of the cured resin coated sand is determined using a Dietert tensile tester. A dump box is filled with resin coated sand. The sand is dumped into a heated quarter inch briquette pattern. The pattern is heated to 480° F.±10° F. The excess sand is scraped off. The pattern is placed in a forced draft oven which is maintained at 480° F. and cured for exactly (5) minutes. The mold is removed from the oven and the briquette is removed from the mold. The briquette is then allowed to cool thoroughly. A Dietert tensile tester is used to break the briquette. The tensile strength of the briquette in pounds per square inch is read directly on the tensile tester. The tensile strength recorded is the average of the tensile strengths of three specimens.

Hot tensile strength.—A dump box is filled with resin coated sand. The sand is dumped into the heated hot tensile strength test pattern of a Dietert hot tensile strength tester. The pattern is equipped with heating means. The resin coated sand is cured in the pattern for 30, 60, 120, or 240 seconds at 460° F.±10° F. to form a cured test specimen. The test specimen is not allowed to cool but is immediately broken. The test pattern is designed so that it also serves as the stress applying portion of the tensile strength tester. The stress in p.s.i. where the test specimen breaks is recorded.

Table I summarizes the results of the testing.

TABLE I.—EFFECT OF FUROIC ACID ON PROPERTIES OF FLAKE PHENOLIC RESINS MADE IN A HOBART MIXER

| Property measured | Sample tested | |
|---|---|---|
| | No additive | 4% furoic acid |
| Melt point, °F | 208 | 190 |
| Tensile strength, p.s.i | 240 | 310 |
| Hot tensile strength, p.s.i., 30 seconds | 41 | 43 |
| Hot tensile strength, p.s.i., 60 seconds | 101 | 108 |
| Hot tensile strength, p.s.i., 120 seconds | 150 | 159 |
| Hot tensile strength, p.s.i., 240 seconds | 170 | 173 |

Using a Simpson Portomuller at 300° F., two batches of resin, one with and the other without, 4% furoic acid, were formulated, coated onto sand, and made into molded compositions. The melting points, tensile strengths, and hot tensile strengths of these molded compositions were determined. In addition, a peel back test was performed as follows:

Resin coated sand is placed in a dump box. The lid of the box consists of a one inch thick aluminum pattern, 14 inches by 18 inches on the sides. The temperature of the pattern is adjusted to 500° F.±10° F. The box is rotated 180° so that the pattern is now at the bottom of the box. The box with the pattern a the bottom is then in what is known as the invest position. After a measured time in the invest position, the box is again rotated 180° so that the pattern once again forms the top of the box. The mold is then in what is known as the invert position. After a measured amount of time in the invert position, the lid of the box is removed along with the sand which has become attached to it. The percent of sand which has peeled from the pattern plate is estimated. After the mold has been allowed to cool its weight is determined.

Table II reports the results of this testing.

TABLE II.—EFFECT OF FUROIC ACID ON PROPERTIES OF FLAKE PHENOLIC RESIN MADE IN SIMPSON MULLER

| Property measured | Sample tested | |
|---|---|---|
| | No additive | 4% furoic acid |
| Melting point, °F | 208 | 200 |
| Tensile strength, p.s.i | 340 | 500 |
| Hot tensile strength, p.s.i., 30 seconds | 93 | 103 |
| Hot tensile strength, p.s.i., 60 seconds | 272 | 235 |
| Hot tensile strength, p.s.i., 120 seconds | 329 | 306 |
| Hot tensile strength, p.s.i., 240 seconds | 297 | 326 |

Peel test, 500° F.

| Test conditions | | Sample tested | | | |
|---|---|---|---|---|---|
| | | No additive | | 4% furoic acid | |
| Invest, sec. | Invert, sec. | Weight of mold, lb./oz. | Peel, percent | Weight of mold, lb./oz. | Peel, percent |
| 60 | 60 | 12/3 | 0 | 12/7 | 0 |
| 90 | 90 | 12/6 | 0 | 13/0 | 0 |
| 120 | 120 | 10/8 | 48 | 12/8 | 20 |

The data indicate that the addition of furoic acid to phenolic resins used to make molding compositions leads to improved cold tensile strength in the molded products made from the molding compositions. No significant change in hot tensile strength of molded compositions occurs when furoic acid is added to the phenolic resins which are used in the preparation of molded compositions. Molded compositions made with phenolic resin containing furoic acid additive were significantly less apt to peel back than were similar molded compositions made without the furoic acid additive. In addition, the presence of furoic acid in moldable compositions led to a larger pickup of sand on the mold.

The moldable compositions were very suitable for use in making molds and cores for foundry applications.

EXAMPLE 2

Molding compositions made from liquid phenolic resins modified by heterocyclic acid additive A phenol formaldehyde resin was made using approximately 0.75 mole formaldehyde per mole of phenol. The resin was polymerized in an aqueous solution with an acidic catalyst. Part, but not all of the water was evaporated from the mixture. The resin remained in the liquid state.

Ethanol was added to the liquid resin mixture to form a resin solution. Hexamethylenetetramine, sand, Acrawax C, and the resin solution were then mulled together and dried to form a moldable composition. The moldable compositions formulated contained 96.29 parts sand, 3.19 parts resin, .38 part hexamethylenetetramine, and .14 part Acrawax C, the parts figures being parts by weight. The moldable composition was made into molded products. A second molding composition was formulated which contained in addition 3.8 parts furoic acid per 96.2 parts resin, the parts figures being parts by weight.

The moldable composition was made by coating sand in a Simpson muller. The sand was heated to 300° F. and placed in the muller. The muller was run until the sand temperature reached 180° F. The resin, hexamethylenetetramine, and ½ of the Acrawax C were added at this time. The muller was run with its exhaust fan on until 2 minutes beyond the time when break-up occurred (the sand stopped being clumped together). The fan was then turned off and the remainder of the Acrawax was added. Mulling was then continued for another 2 minutes before the resin coated sand was dumped.

The coated sand was tested for melting point. Molded compositions made from the coated sand were tested for tensile strength, hot tensile strength, and peel resistance. The tests were performed as described in Example 1. Table III summarizes the results of this testing.

TABLE III.—EFFECTS OF FUROIC ACID ON RESIN PROPERTIES

| Property measured | Sample tested | |
|---|---|---|
| | No additive | 4% furoic acid |
| Melting point, °F | 215 | 207 |
| Tensile strength, p.s.i | 455 | 450 |
| Hot tensile strength, 30 second p.s.i | 60 | 50 |
| Hot tensile strength, 60 seconds p.s.i | 130 | 100 |
| Hot tensile strength, 120 seconds p.s.i | 210 | 200 |
| Hot tensile strength, 240 seconds p.s.i | 200 | 240 |

Peel test, 500° F.

| Test conditions | | Sample tested | | | |
|---|---|---|---|---|---|
| | | No additive | | 4% furoic acid | |
| Invest, sec. | Invert, sec. | Weight of mold, lb./oz. | Peel, percent | Weight of mold, lb./oz. | Peel, percent |
| 60 | 60 | 8/11 | 75 | 10/4 | 25 |
| 30 | 30 | 9/0 | 5 | 8/11 | 0 |

Molded compositions made from phenolic resins which contain furoic acid have been shown to attain a higher ultimate cold tensile strength than similar molded compositions made without the addition of furoic acid. Peelback is much less likely to occur in molded compositions containing furoic acid than in molded compositions which do not contain this additive. Molds tend to retain a greater weight of molding composition when the resin used making the molding composition contains a heterocyclic acid. The melting point of a moldable composition containing furoic acid is only slightly less than the melting point of a similar composition which does not contain furoic acid.

While the invention has been described in connection with specific embodiments thereof, it will be understood that it is capable of further modification, and this application is intended to cover any variations, uses, or adaptations of the invention following, in general, the principles That which is claimed is:

1. A composition comprising from about 65% to about 99%, by weight, solid discrete inert filler particles and from about 1% to about 35%, by weight, thermosetting phenolic resin composition, said thermosetting phenolic resin comprising:
   reaction product of an aldehyde with a phenolic compound in the ratio of between about 0.5 and about 0.85 mole of aldehyde per mole of phenolic compound;
   a cross-linking agent which cross-links the reaction product and
   a heterocylic acid having a heterocyclic ring containing conjugated double bonds which imparts a high degree of fluidity to the resin in its fused state in an amount falling within the range from about 0.5% to about 12% by weight of the reaction product.

2. The composition of claim 1 wherein the aldehyde is formaldehyde and the phenolic compound is phenol.

3. The composition of claim 2 wherein the cross-linking agent is selected from the group consisting of hexamethylenetetramine and its chloride, sulfate, acetate, tartrate, citrate, benzene sulfonate, toluene p-sulfonate, camphorate, arsenate, trimetaborate, sulfo-salicylate, phthalate, perchlorate, chromate, and tannate salts, resole resins, paraformaldehyde, trioxymethylene, epoxy compounds, diisocyanates and mixtures thereof.

4. The composition of claim 3 wherein the cross-linking agent is hexamethylenetetramine.

5. The composition of claim 3 wherein the resin is a novolac resin.

6. The composition of claim 5 wherein the heterocylic acid may be represented by the formula:

R—Ht—COOH where R is selected from the group consisting of hydrogen, methyl, ethyl, fluoro, hydroxyl, and methoxy and Ht is a divalent heterocyclic radical.

7. The composition of claim 6 wherein the divalent heterocyclic radical is selected from the group consisting of pyridenediyl, furandiyl, thiophenediyl, and pyrrolediyl.

8. The composition of claim 6 wherein the heterocyclic acid is 2-furoic acid.

9. The composition of claim 1 wherein the filler particles are selected from the group consisting of sand, asbestos, saw dust, fiberglass, and abrasive grift.

10. The composition of claim 9 wherein the filler particles are sand.

11. A molded product produced by heating the composition of claim 1 in a mold.

12. A composition comprising solid discrete filler particles coated with a thermosetting phenolic resin in an amount from about 1% to about 35% by weight of the composition, said thermosetting phenolic resin comprising:
   the reaction product of an aldehyde with a phenolic compound in the ratio of between about 0.5 and about .85 mole of the aldehyde per mole of the phenolic compound;
   an amount of a cross-linking agent which cross-links the reaction product falling within the range from about 2% to about 20% by weight based on the resin weight; and
   a heterocyclic acid having a heterocyclic ring containing conjugated double bonds which imparts a high degree of fluidity to the resin in its fused state in an amount falling within the range from about 0.5% to about 12% by weight of the reaction product.

13. The composition of claim 12 wherein the aldehyde is formaldehyde and the phenolic compound is phenol.

14. The composition of claim 13 wherein the cross-linking agent is selected from the group consisting of hexamethylenetetramine and its chloride, acetate, tartrate, citrate, benzene sulfonate, toluene p-sulfonate camphorate, arsenate, trimetaborate, sulfo-salicylate, phthalate, perchlorate, chromate, and tannate salts, resole resins, paraformaldehyde trioxymethylene, epoxy compounds, diisocyanates, and mixtures thereof.

15. The composition of claim 14 wherein the cross-linking agent is hexamethylenetetramine.

16. The composition of claim 14 wherein the resin is a novolac resin.

17. The composition of claim 12 wherein the heterocyclic acid may be represented by the formula:

R—Ht—COOH where R is selected from the group consisting of hydrogen, methyl, ethyl, fluoro, hydroxyl, and methoxy, and Ht is a divalent heterocyclic radical.

18. The composition of claim 17 wherein the divalent heterocyclic radical is selected from the group consisting of pyridenediyl, furandiyl, thiophenediyl, and pyrrolidiyl.

19. The composition of claim 12 wherein the heterocyclic acid is 2-furoic acid.

20. The composition of claim 12 wherein the filler particles are selected from the group consisting of sand, asbestos, sawdust, fiberglas, and abrasive grit.

21. The composition of claim 20 wherein the filler particles are sand.

22. A molded product produced by heating the composition of claim 12 in a mold.

23. A process for preparing a moldable composition which comprises:
   (a) coating solid discrete inert filler particles with from about 1% to about 35%, by weight, of a thermosetting phenolic resin comprising:
      the reaction product of an aldehyde and a phenolic compound,
      a heterocyclic acid having a heterocyclic ring containing conjugated double bonds, and
         a cross-linking agent, wherein the mole ratio of the aldehyde to the phenolic compound falls within the range from about 0.5 to 0.85, the heterocyclic acid is present in an amount falling within the range from about 0.5% to about 12% by weight of the reaction product, and the cross-linking agent is present in an amount falling within the range from about 2% to about 20% by weight of the mixture; and
   (b) recovering the moldable composition.

24. The process as in claim 23 wherein the aldehyde is formaldehyde and the phenolic compound is phenol.

25. A process as in claim 24 wherein the cross-linking agent is selected from the group consisting of hexamethylenetetramine and its chloride, sulfate, acetate, tartrate, citrate, benzene sulfonate, toluene p-sulfonate, camphorate, arsenate, trimetaborate, sulfo-salicylate, phthalate, perchlorate, chromate and tannate salts, resole resins, paraformaldehyde, trioxymethylene, epoxy compounds, diisocyanates, and mixtures thereof.

26. The process as in claim 25 wherein the cross-linking agent is hexamethylenetetramine.

27. The process as in claim 26 wherein the resin is a novolac resin.

28. The process as in claim 23 wherein the heterocyclic acid contains conjugated double bonds and may be represented by the formula:

R—Ht—COOH where R is selected from the group consisting of hydrogen, methyl, ethyl, fluoro, hydroxy, and methoxy, and Ht is a divalent heterocyclic radical.

29. The process as in claim 28 wherein the divalent heterocyclic radical is selected from the group consisting of pyridenediyl, furandiyl, thiophenediyl, and pyrrolediyl.

30. The process as in claim 28 wherein the heterocyclic acid is 2-furoic acid.

31. The process as in claim 23 wherein the filler particles are selected from the group consisting of sand, asbestos, sawdust, fiberglas, and abrasive grit.

32. The process as in claim 31 wherein the filler particles are sand.

33. A process for preparing a dry free flowing resin coated sand comprising:
coating sand with from about 2% to about 5% of a mixture of:
(1) the reaction product of formaldehyde and phenol wherein the mole ratio of the formaldehyde to the phenol falls within the range from about 0.5 to about 0.85,
(2) a heterocyclic acid represented by the formula:

R—Ht—COOH where R is selected from the group consisting of hydrogen, methyl, ethyl, fluoro, hydroxyl, and methoxy radicals, and Ht is selected from the group consisting of pyridenediyl, furandiyl, thiophenediyl, and pyrrolediyl, in an amount of from 0.5% to about 12% by weight of the reaction product, and (3) a cross-linking agent selected from the group consisting of hexamethylenetetramine and its chloride, sulfate, acetate, tartrate, citrate, benzene, sulfonate, toluene p-sulfonate, camphorate, arsenate, trimetaborate, sulfo-salicylate, phthalate, perchlorate, chromate, and tannate salts, resole resins, paraformaldehyde, trioxymethylene, epoxy compounds, diisocyanates, and mixtures thereof in an amount falling within the range from about 2% to about 20% by weight of the resins, and recovering the dry free flowing resin coated sand.

34. The process in accordance with claim 33 wherein the resin is a novolac resin, the heterocyclic acid is 2-furoic acid, the cross-linking agent is hexamethylenetetramine, and the hexamethylenetetramine is present in an amount falling within the range from about 8% to about 18% by weight based on resin weight.

References Cited

UNITED STATES PATENTS

| 2,970,121 | 1/1961 | Schmittberger | 260—59 X |
| 3,020,254 | 2/1962 | Less et al. | 260—38 |
| 3,331,730 | 7/1967 | Bean et al. | 260—59 X |

LEWIS T. JACOBS, Primary Examiner

U.S. Cl. X.R.

260—Dig 40